July 17, 1956 E. H. ANDERSEN 2,755,108
DEVICES FOR HOLDING DEEP WELL COOKER SHELLS
Filed June 8, 1951
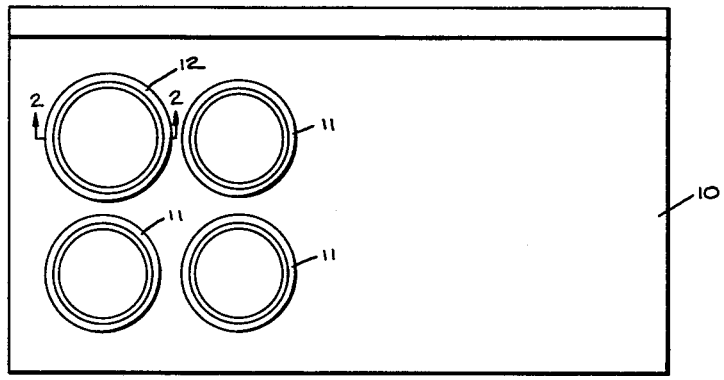
FIG. 1
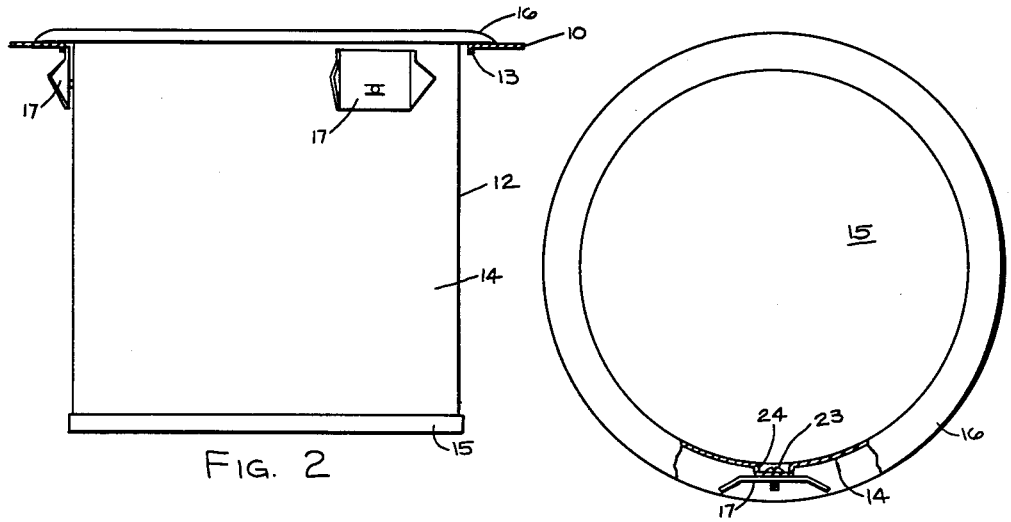
FIG. 2
FIG. 3
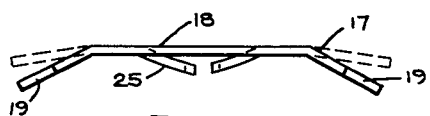
FIG. 4
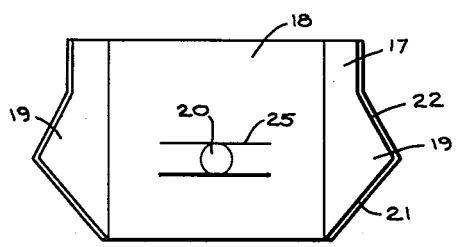
FIG. 5
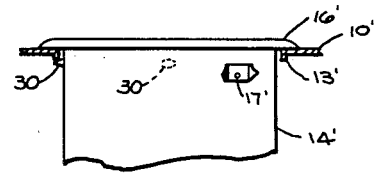
FIG. 6
INVENTOR.
EARL H. ANDERSEN
BY Richard A. Parsons

United States Patent Office

2,755,108
Patented July 17, 1956

2,755,108

DEVICES FOR HOLDING DEEP WELL COOKER SHELLS

Earl H. Andersen, Greenville, Mich., assignor to Gibson Refrigerator Company, Greenville, Mich., a corporation of Michigan Application June 8, 1951, Serial No. 230,554

7 Claims. (Cl. 285—189)

The invention relates to devices for holding deep well cooker shells in place in the opening in the range top.

The principal object of the present invention is to provide a simple and positive means for holding deep well cooker shells in place in the corresponding opening therefor in the range top.

Another object is to provide such a means that will permit ready installation or removal of the cooker shell from the range when desired.

A further object is to provide such a means that will hold the deep well cooker shells in place in openings of varying sizes and shapes.

A still further object is to provide such a device that is cheap and easily manufactured and installed.

These objects will more fully appear in the following specification when read in connection with the accompanying drawings, wherein:

Figure 1 is a plan view of a range having a deep well cooker mounted therein;

Figure 2 is a fragmentary sectional view taken through the range on substantially the line 2—2 of Figure 1;

Figure 3 is an enlarged plan view of the deep well cooker with the invention thereon, parts being broken away to show the construction thereof;

Figure 4 is a plan view of a clip embodying the invention;

Figure 5 is a front elevational view of the clip; and

Figure 6 is a view similar to Figure 2 showing a modified form of the invention.

In cooking ranges, particularly electric ranges, the deep well cooker shells, if such are provided, have ornamental flanges or bezel rings about the upper perimeters which overlie the range top and support the deep well cooker shells on the range top. It is important, however, that the deep well cooker shell be fastened to the range top, so that the shell be not lifted out of the opening in the range top except when desired for cleaning or repair. The present invention accomplishes that purpose.

Figure 1 illustrates a range top 10 of conventional construction having a plurality of burners 11 and a deep well cooker shell 12 in suitable openings therein. The top is flanged downwardly around the openings as at 13 (Figure 2).

Mounted in the deep well cooker opening in the range top is the deep well cooker shell 12 mentioned above. The cooker shell comprises a cylindrical side wall 14, a bottom wall 15, and a bezel ring 16 at its upper end. The latter is usually chrome plated and may be integral with the shell side wall 14, or a separate ring attached thereto. Usually it is the latter. The bezel ring 16 overlies the range top around the opening therein and supports the deep well cooker shell.

Attached to the cylindrical side wall 14 preferably at equally spaced intervals are three clips 17 for holding the deep well cooker shell in place. These clips are pressed from resilient sheet metal into the form shown in Figures 4 and 5. They are generally U-shaped in horizontal plan, the central portions 18 being flat, and having a pair of legs 19 bent out at an obtuse angle. In the center of each clip is a hole 20 to receive a bolt or screw or like fastening means for attaching the clip to the cooker shell 14. Preferably the metal at each side of hole 20 is slit and struck outward at 25 to form what is normally known as a speed nut.

The edges of the extremities of the legs are inclined outwardly and upwardly at 21, and outwardly and downwardly at 22, preferably terminating in a point as seen in Figure 5. These inclined edges form cam surfaces for a purpose which will presently appear.

The clips 17 are attached to the deep well cooker shell just below the top by bolts 23 or the like, with the legs of the clips extending outwardly. See Figure 3. Preferably the deep well cooker shell is provided with seats 24 which are embossments projecting outwardly.

The clips are so designed that when in their normal position (Figure 4) the extremities of the clips project beyond the rim of the opening in the top wall. The inner extremities of the inclined edges or cam portions of the clips are always located radially inwardly of the perimeter of the opening in the top wall.

Thus to insert the deep well cooker shell in the range top it is necessary only to lower the cooker into the shell until the lower inclined edges 21 rest upon the range top. A downward push will then cause the legs of the clips to flex, as shown in broken lines in Figure 4, until the extremities of the clips pass the perimeter of the opening. As soon as the extremities pass the lower edge of flange 13 they will snap back beneath the flange so that the upper inclined edges 22 contact the lower edge of the flange 13 and pull the bezel ring 16 securely against the top. The three clips accurately center the cooker in the opening.

To remove the cooker shell it may be pried upwardly so that the upper inclined edges 22 cam the extremities inwardly to pass the flange 13. There is a possibility, however, in this procedure, of chipping the enamel on the range. Therefore, it is preferred to remove the screws by means of a screwdriver. As the heads of the screws are inside of the shell they are easily removable. The clips will simply fall into the usual drip pan where they can be recovered and reattached to the deep well cooker shell.

A variation of the invention is shown in Figure 6. In this form of the invention but one clip is used at one side of the deep well cooker shell. Opposed to it are one or two, preferably two, projections on the burner shell.

In this form of the invention the range top 10' has an opening therein surrounded by a flange 13'. A deep well cooker shell side wall 14' with a bezel ring 16' mounted in the opening. Secured to the shell side wall is a single clip 17' similar to those previously described. On the opposite side of the side wall 14' opposite the clip are two spaced apart protuberances 30 which are pressed outwardly from the side wall. The protuberances 30 are located so as to closely underlie the flange 13' when the cooker shell is in place.

The cooker shell may be inserted in the range top by lowering the same until the protuberances 30 and clip 17' rest on top of the range. Then a vigorous downward push will flex the clip sufficiently to permit its passage together with the protuberances into place as shown in Figure 6.

From the foregoing it will be seen that the present invention provides a simple and positive means for holding a deep well cooker shell in place in a range, yet permits the shell to be easily inserted or removed.

Furthermore, the clips accommodate the deep well cooker in openings of slightly varying size and shape,

I claim:

1. In a structure having a top with an opening therein, a bezel ring in said opening and having a portion overlying said top around said opening, a shell member attached to said bezel ring and extending downwardly through said opening and below said top, and means on said shell member for holding the bezel ring and said member in place in said opening comprising a plurality of clips, said clips being thin resilient plates attached centrally thereof to said shell member and having a pair of free end portions extending horizontally outwardly from said member, said free end portions underlying said top in contact therewith and having the lower portions of their upright edges inclined upwardly and outwardly from the bottom edges of said clips.

2. In a structure having a top with an opening therein, a bezel ring in said opening and having a portion overlying said top around said opening, a shell member attached to said bezel ring and extending downwardly through said opening and below said top, and clips on said shell member for holding the bezel ring and said member in place in said opening, said clips being generally U-shaped in horizontal section and of substantial vertical extent, the central portions of said clips being attached to said member beneath the top of the bezel ring and the free extremities of said clips underlying said top in contact therewith, said free extremities of said clips being flexible and having edges inclined outwardly from the lower horizontal edges of said clips to form cam surfaces whereby when said shell member is inserted into the opening the free extremities of said clips are flexed to permit passage thereof past the perimeter of said opening.

3. In a structure having a top with an opening therein, a bezel ring, a shell member and clips thereon of the character defined in claim 2, wherein the number of clips is at least three, and they are equidistantly spaced around the perimeter of the shell member.

4. In a structure having a top with an opening therein, a bezel ring in said opening and having a portion overlying said top around said opening, a shell member attached to said bezel ring and extending downwardly through said opening and below said top, and clips on said shell member for holding the bezel ring and said member in place in said opening, said clips being generally U-shaped in horizontal section and of substantial vertical extent, the central portions of said clips being attached to said member beneath the top of the bezel ring and the free extremities of said clips underlying said top in contact therewith, said free extremities of said clips being flexible and having edges inclined outwardly from the lower and upper horizontal edges of said clips to form cam surfaces whereby when said shell member is inserted into or removed from said opening the free extremities of said clips are flexed to permit passage thereof past the perimeter of said opening.

5. In a structure having a top with an opening therein, a bezel ring, a shell member and clips thereon of the character defined in claim 4, wherein the number of clips is at least three, and they are equidistantly spaced around the perimeter of the shell member.

6. In a structure having a top with an opening therein, a bezel ring in said opening and having a portion overlying said top around said opening, a shell member attached to said bezel ring and extending downwardly through said opening and below said top, and means for holding the bezel ring and said member in place in said opening comprising a clip, said clip being a thin resilient plate attached centrally thereof to said shell member and having free end portions extending horizontally outwardly from said member, said free end portions underlying said top in contact therewith and having the lower portions of their upright edges inclined upwardly and outwardly from the bottom edges of said clip.

7. In a cooking range of the character defined in claim 6 wherein said means for holding said bezel ring in place includes an outwardly extending protuberance on said bezel ring at a point spaced angularly a substantial distance from said clip.

References Cited in the file of this patent

UNITED STATES PATENTS

| Number | Name | Date |
|---|---|---|
| 32,964 | Dare | July 30, 1861 |
| 485,011 | Kneeland | Oct. 25, 1892 |
| 498,299 | Petway et al. | May 30, 1893 |
| 541,397 | Swartwout | June 18, 1895 |
| 902,363 | Appleton | Oct. 27, 1908 |
| 947,829 | Lesley | Feb. 1, 1910 |
| 1,163,389 | Brown | Dec. 7, 1915 |
| 1,568,799 | Clark | Jan. 5, 1926 |
| 1,788,612 | Benson | Jan. 13, 1931 |
| 2,062,685 | Tinnerman | Dec. 1, 1936 |
| 2,148,278 | Rose | Feb. 21, 1939 |
| 2,217,804 | McCormick | Oct. 15, 1940 |
| 2,267,314 | Strikeleather | Dec. 23, 1941 |
| 2,333,508 | Barnsteiner | Nov. 2, 1943 |
| 2,539,172 | Andrews | Jan. 23, 1951 |
| 2,568,973 | Snow | Sept. 25, 1951 |